July 15, 1958     J. I. MONTEL ET AL     2,843,139
WATER TREATING SYSTEM AND APPARATUS THEREFOR
Filed Nov. 23, 1953     2 Sheets-Sheet 1

INVENTORS
J.I.MONTEL
W.C.HAMMOND
BY
ATTORNEY

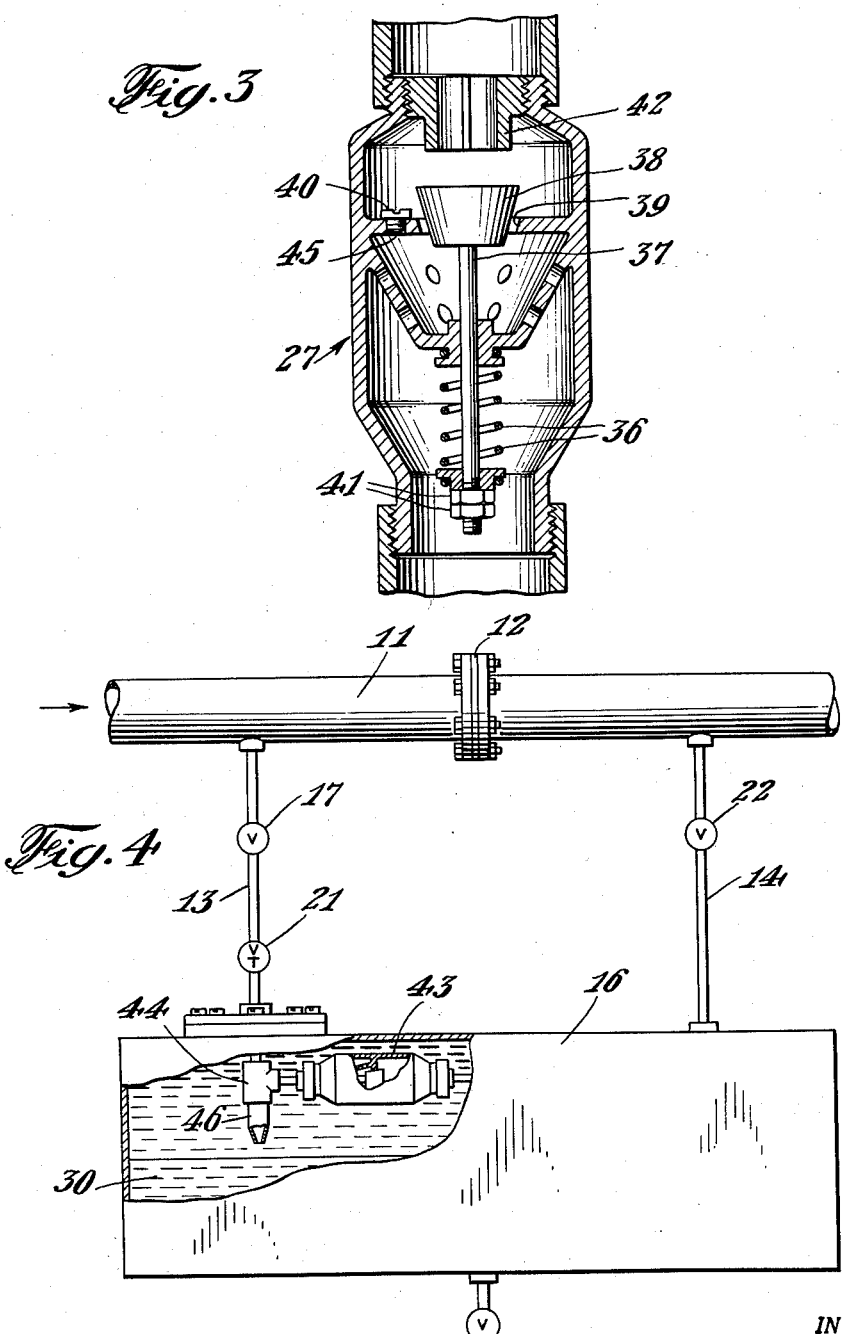

United States Patent Office 2,843,139
Patented July 15, 1958

2,843,139

WATER TREATING SYSTEM AND APPARATUS THEREFOR

Joseph I. Montel, Jamaica, and William C. Hammond, Valley Stream, N. Y., assignors to Hammond-Montel, Inc., Elmhurst, N. Y., a corporation of New York Application November 23, 1953, Serial No. 393,814

7 Claims. (Cl. 137—101.11)

The present invention relates primarily to improvements in water treating systems and apparatus, and more particularly to improved and novel arrangements and apparatus for treating a fluid, such as water flowing in a main, with a chemical or other agent.

It is often desirable to add a chemical solution or agent to a liquid such as water flowing in a main supplying an office building or apartment house, for example, in order to inhibit the rusting and/or corrosion effects of the water while in the local distributing lines. Normally the treating agent is added substantially proportionally to the volume of water flowing in the main, which volume normally varies in a twenty-four hour period from practically nothing to a maximum. Obviously, when the volume of flow is at a maximum, the water is in the local distributing lines such a short period of time that it normally has no corrosion or rusting effect, and consequently the treating agent is effectively wasted.

In accordance with the above, it is one of the principal objects of the present invention to provide a water treating arrangement for adding a treating agent to water flowing in a main in direct proportion to the volume of water flowing up to a predetermined rate of flow and to proportionally reduce, limit, and/or cease treating the water when the flow thereof exceeds the said predetermined rate of flow.

Another object of the present invention in connection with the above object is to provide a water treating system and apparatus wherein the treating agent is conserved during the time its effectiveness in the distributing lines is at a minimum.

Still another object of the present invention is to provide a system and apparatus with the above features and wherein the predetermined rate of flow in the supply main above which proportional treatment ceases or is proportionally reduced can readily be varied and changed for changing conditions.

Still another object of the present invention is to provide a water treating system and apparatus incorporating the above features that is inexpensive to install and maintain, and that is reliable and foolproof in operation.

The above and further objects and features of the present invention will be more apparent in the following detailed description thereof wherein reference is made to the accompanying drawings, in the latter of which:

Figs. 2 and 3 are enlarged detailed sectional views of valves employed in the described system; and Fig. 4 is a diagrammatic representation of a modification of the present invention.

While the following explanatory detailed description of the invention sets forth the manner in which it may be employed in conjunction with the adding of a chemical or agent to water flowing in a water main, for example, on supplying an apartment house, so as to control the pH of the water, it will be obvious that the invention is not limited to this particular application but may be employed in various other instances where similar or like conditions exist.

Figure 1:
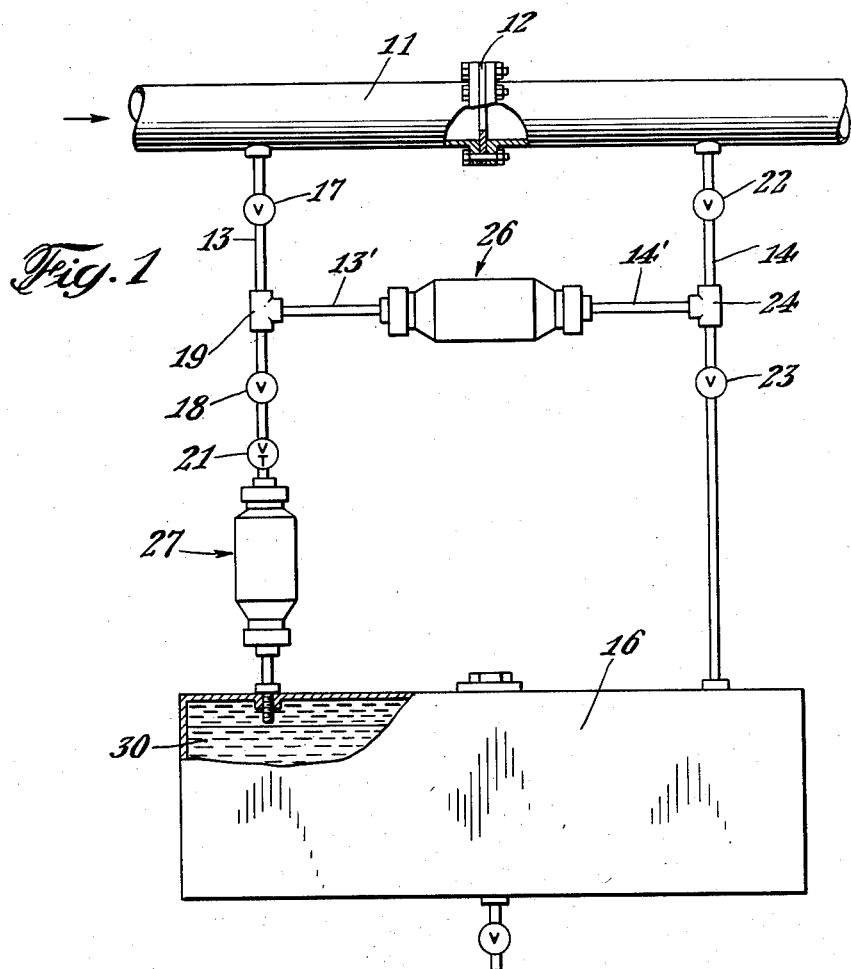
Fig. 1 is a diagrammatic representation of the general manner in which the elements of a water treating system incorporating the features of the present invention are arranged.

Referring now to Fig. 1, which shows a water main 11 through which water is normally adapted to flow in the direction indicated by the arrow to supply a building such as, for example, a relatively large office building, hotel or apartment, an orifice 12 or restricting device is inserted in the main 11 in a suitable manner so that a pressure differential is developed on opposite sides of the orifice in proportion to the rate of flow or velocity of the water in the main. Suitable pipe connections or pressure taps 13 and 14 are connected into the main on the upstream and downstream sides respectively of the orifice and lead to a closed tank 16 containing the chemical agent with which the water is to be treated. For purposes hereinafter described and apparent, the pipe connection 13 has therein a pair of shut-off valves 17 and 18, one on each side of a T 19 and a manually operable control or throttle valve 21. The pipe connection 14 has shut-off valves 22 and 23 on each side of a T 24. Connected through the T's 19 and 24 to the two pipe connections 13 and 14 is an automatic valve indicated generally by reference numeral 26, which together with an automatic valve 27 in the pipe connection 13 functions as hereinafter described to regulate the system in the desired manner.

The tank 16 contains a solution 30 with which the water is to be treated, and since it preferably has a somewhat greater specific gravity than the water, it will tend to remain in the lower part of the tank and be displaced by the water as it is used. In normal operation of the system or during periods of low demand when the rate of flow of water in the main 11 is less than a predetermined rate, the shut-off valves 17, 18, 22 and 23 will all be open and the control valve 21 adjusted to permit the desired flow through the pipe connections 13 and 14 due to the pressure differential developed on opposite sides of the orifice 12. At this time the automatic valve 26 will be closed to prevent flow therethrough and the automatic valve 27 will be open. Thus during these conditions the developed pressure differential will cause a flow of water from the main 11 down through the pipe connection 13, into and through the tank 16, up through the pipe connection 14 and back into the main. As the water flows over the chemical 30 in the tank 16 it picks up some of the chemical by mixing, impinging, diffusion, and/or otherwise, which together with the water is discharged into the main. Since the amount of water flowing through the tank 16 is directly proportional to the rate of flow through the main 11 and the amount of chemical picked up or diffused and mixed in the water is substantially proportional to the flow of water thereover, the amount of chemical discharged into the main will for all practical purposes be proportional to the flow in the main as long as this flow remains under a predetermined rate. However, when the demand for water in the main 11 exceeds a predetermined amount, the orifice 12 which must be such as to develop a reasonable pressure differential for low rates of flow, developes a considerable differential pressure and a corresponding greater flow of water is directed through the tank 16. This increased flow of water through the tank would, without the valves 26 and 27, as will be described, agitate the chemical solution therein and thereby cause proportionally greater amounts thereof to be discharged into the main. The chemical which is thus discharged at a greater rate per unit of volume of water flowing through the main overtreats the water, constituting a waste of the chemical, and furthermore this overtreatment occurs during the time that the water is in the distributing lines such a short time that rust and corrosion, which are time functions, have practically no time to develop. As will now be described, the inclusion of the automatic valves 26 and 27 in the above system eliminates this condition.

Figure 2:
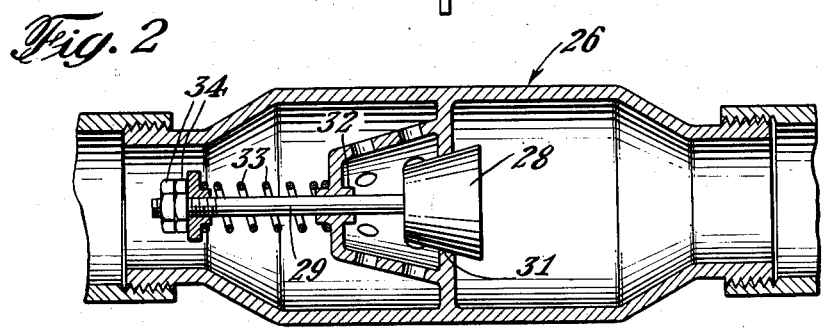

The valve 26, Fig. 2, which is connected by pipe connections 13' and 14' between the T's 19 and 24, includes an element 28 secured to the right hand of a rod 29. It will be understood that the valve 26 is circular in cross-section and that the element 28 seating against the circular seating surface 31 prevents the flow of water therethrough. The rod 29 is guided for lengthwise movement in the section 32 of the valve and has a spring 33 surrounding the major portion thereof which urges the rod 29 and element 28 to the left, and under normal conditions or when the rate of flow of water in the main 11 is less than a predetermined rate, the spring 33 holds the element 28 against the seating surface 31. A pair of nuts 34 threaded on the left hand end of the rod 29 permits the compression force of the spring to be varied so as to require different pressures on the element 28 to unseat the same.

The valve 27, Fig. 3, is somewhat similar to valve 26 but operates in a different manner. Normally the spring 36 of valve 27 holds the rod 37 and element 38 in an elevated position with the element 38 out of engagement with the seating surface 39. Thus the valve 27 is normally open to permit the flow of water therethrough. Nuts 41 on the rod 37 permit adjustment of the spring 36 so as to vary the force required to move the element 38 into engagement with the seating surface 39. The valve 27 has an internal pipe or jet 42 which directs the water flowing down through the valve against the upper surface of the element 38.

Let it be assumed that the system is working in a normal manner with the demand for water in the main being less than a predetermined rate. During those times the valve 26 will remain closed and the valve 27 will remain open. Accordingly the varying pressure differential developed will cause a proportional flow of water through the tank to pick up a corresponding amount of the chemical 30 and discharge it into the main 11. This condition prevails as long as the demand for water from the main 11 remains below a certain rate with the developed differential pressure varying in direct proportion to the demand.

Now let it be assumed that the demand for water from the main 11 increases either gradually or suddenly, as it frequently does, to a rate greater than the normal predetermined rate. As the developed differential pressure increases above that corresponding to the predetermined rate of flow of water in the main 11, the increased differential pressure is effective on the element 38 of valve 27 to move it against the action of spring 36 toward its seating surface 39 to close or restrict the flow of water therethrough and concomitantly move the element 28 of valve 26 against the action of spring 33 away from its seating surface 31 to permit the flow of water therethrough which by-passes the tank 16. The rate of movement of the elements 28 and 38 will correspond to the rate at which the differential pressure increases, and for gradual increases of the differential pressure the elements 38 and 28 will gradually move toward and away respectively from their respective seating surfaces so as not to disturb the predetermined effect. Accordingly, the increased amount of water which otherwise would flow through the tank 16 and pick up excessive amounts of chemical 30 causing overtreatment of the water, is by the valves 26 and 27 diverted for these abnormal conditions back into the main, and during these abnormal conditions there will be less treatment of the water flowing in the main.

If it is desired to slightly treat the water flowing in the main during periods of high rates of flow, the removal of a relatively small plug 40 from a small hole 45 in the ring forming the seating surface 39 of valve 27 permits a small flow of water through the valve when the element 38 is seated. This small flow of water in passing over the chemical in the tank 11 picks up a minimum amount thereof and discharges it into the main 11.

As soon as the rate of flow in the main 11 decreases to not more than the predetermined rate, the decreased developed differential pressure is not sufficient to overcome the effects of the springs 33 and 36 in the valves 26 and 27 respectively, and valve 26 closes while valve 27 opens. Thereafter the normal treatment of the water is resumed and the amount of chemical 28 added to the water in the main is proportional to the rate of flow. The force required to overcome the springs 33 and 36 can be varied by adjusting the nuts 34 and 41 in the valves so that they will operate for different developed differential pressures, and if desired the valves 26 and 27 can be adjusted by means of the springs therein to operate together, or for either one to operate before the other.

In order that the correct treatment for the water flowing in the main be maintained for extremely small rates of flow, or the time when it is most needed, the orifice 12 must restrict the main sufficiently to product a differential pressure for the low rates of flow. An orifice sufficiently restrictive for this purpose may offer too much restriction at high rates of flow and accordingly the pressure tap connections 13 and 14 above the T's 19 and 24, as well as the sections 13' and 14' and the valve 26, may be sufficiently large to provide, when the valve 26 is open as it will be during high rates of flow, an effective by-pass for the orifice 12. For example, with a four inch or larger main 11 the upper sections of the pressure taps 13 and 14, the sections 13' and 14' and the valve 26 may be two inches in diameter while the lower sections of the pressure taps may be much smaller. Although the valves 26 and 27 have been shown and described as two separate valves, they may be incorporated in a single valve with the valving elements on a single rod so that as one element opens, the other would close and vice versa. It sometimes happens that due to various causes such as a broken street main, for example, the water supply is temporarily shut off, and during these times the pressure in a building supply main such as 11, Figs. 1 and 4, may drop and cause flow of the water in a reverse direction. It is highly important during such reverse flow that no treatment of the water take place since the same water might again be treated, resulting in overtreatment, when normal flow is resumed. During flow of water through the main 11 in a direction opposite to its normal flow, the pressure differential developed is effective on the valve 27 in the opposite direction and causes the element 38 to rise and seat the top surface thereof against the end of the jet 42. This prevents further flow through the valve 27 in the reverse direction and thereby no chemical can be added to the water flowing in a reverse direction in the main.

In the modification of the invention shown in Fig. 4, a pressure operated check valve 43 is employed which may be similar in construction to the valve 26, Figs. 1 and 2, and preferably has adjusting means whereby it is operable at different pressures. As shown in Fig. 4, the valve 43 is connected by a T 44 to the lower end of the pressure tap 13, the other outlet of the T having a jet 46 thereon. The valve 43, the T 44 and jet 46 are all contained in the chemical tank 16 and normally in the upper section thereof so as to be in the water and above the level of the chemical agent 30. The outlet of the valve 43 is directed toward the outlet or pressure tap 14 of the tank which in turn is connected to the main 11 on the downstream side of the orifice 12.

During periods of normal flow the valve 43 remains closed and the developed differential pressure causes proportionate flow through the tap 13 and jet 46 into the tank 16 and against the chemical 28 where the water picks up the chemical and both are discharged back into the main. When the developed differential pressure reaches a predetermined pressure due to increased flow in the main, the jet 46 restricting the flow therethrough causes the valve 43 to open. Preferably the valve 43 is arranged to gradually open in accordance with the differential pressure increase above the predetermined value so as not to disturb the predetermined effect. Thus, as long as the abnormally large rate of flow continues, a portion of the water flowing through the tap 13 is diverted through the valve 43 toward the outlet tap 14 and hence will not have as much of a chance to mingle and mix with the chemical. Accordingly the chemical picked up by the water flowing through the tank will be less per unit of volume of such water, and the large volume of water flowing in the main will be undertreated. At these times the treatment is not of much value as the water is in the distributing system such a short time. When the flow in the main returns to its normal rate or something below the predetermined rate, the valve 43 closes and proportionate treatment of the water is resumed. With the valve 43 arranged to gradually close and open as the developed pressure differential increases and decreases above the predetermined value, the change from normal treatment of the water in the main to undertreatment, and in the reverse direction, is progressive and gradual. If desired, the jet 46 could be replaced with a valve similar to the above described valve 27 so as to prevent flow of water against the chemical treating agent during periods of high rate of flow in the main 11.

While the invention has been described in but a preferred and one modified embodiment, it will be apparent that various other modifications may be made therein without departing from the spirit or essential attributes thereof, and it is desired, therefore, that only such limitations be placed thereon as are imposed by the appended claims.

What is claimed is:

1. In a water treating system, a main adapted to convey a flow of water under pressure, a restriction in said main for developing a differential pressure in proportion to the rate of flow of water in said main, a closed container containing a solution of greater specific gravity than water for treatment of said water, hydraulic connections between the top of said container and the high and low pressure sides of said restriction, means dependent upon the developed differential pressures and including said hydraulic connections to divert corresponding amounts of said water around said restriction and through said container, said diverted water flowing over and mixing with said solution to discharge the same into said main for treatment of the water flowing therein, a variable restrictive by-pass valve between said hydraulic connections and around said container, and means operative by said developed differential pressure to automatically operate said valve to by-pass increasing amounts of the diverted water around said restriction and said container when and as the said developed differential pressure exceeds a predetermined amount whereby the degree of treatment of said water flowing in said main is decreased when the rate of flow exceeds a predetermined rate.

2. In a water treating system, a main adapted to convey a flow of water under pressure, a restriction in said main for developing a differential pressure in proportion to the rate of flow of water in said main, a closed container for a solution for treatment of said water, said solution being of greater specific gravity than water, hydraulic connections between the top of said container and the high and low pressure sides of said restriction, means dependent upon the developed differential pressures and including said hydraulic connections to divert corresponding amounts of said water around said restriction and through said container, said diverted water flowing over and mixing with said solution to discharge the same into said main for treatment of the water flowing therein, said diverted water until a predetermined differential pressure is reached being directed against said solution on entering said container, a pressure operated valve and means for operating said valve by said developed differential pressure when the same exceeds said predetermined amount to direct a part of the water entering said container in the direction of the outlet hydraulic connection thereto whereby the diverted water has less chance to mix with said solution and the degree of treatment of the water flowing in said main is less when the rate of flow thereof exceeds a predetermined rate.

3. In a water treating system, a main adapted to convey a flow of water under pressure, a restriction in said main for developing a differential pressure in proportion to the rate of flow of water in said main, a closed container for a solution for treatment of said water, hydraulic connections between said container and the high and low pressure sides of said restriction, means dependent upon the developed differential pressures and including said hydraulic connections to divert corresponding amounts of said water around said restriction and through said container, said diverted water mixing with said solution to discharge the same into said main for treatment of the water flowing therein, a by-pass connection between said hydraulic connections and around said restriction and said container, a first valve in said by-pass connection, a second valve in the inlet hydraulic connection to said container, said valves being operated by the developed differential pressure, and means including said valves to bypass the diverted water around said container and vary the rate of treatment of the water flowing in said main when the rate of flow exceeds a predetermined rate.

4. A system as set forth in claim 3, and including adjustable means cooperating with said valves to change the rate of flow at which said valves operate to by-pass the diverted water and vary the rate of treatment of the water in said main.

5. In a water treating system, a main adapted to convey a flow of water under pressure, a restriction in said main for developing a differential pressure in proportion to the rate of flow of water in said main, a closed container for a solution for treatment of said water, hydraulic connections between said container and the high and low pressure sides of said restriction, means dependent upon the developed differential pressures and including said hydraulic connections to add quantities of said solution from said container to the water flowing in said main in proportion to the rate of flow therein up to a predetermined rate of flow, a pair of variable flow pressure operated valves associated with said hydraulic connections, one of said pressure operated valves restricting flow therethrough in proportion to the developed differential pressure and the other of said valves restricting flow therethrough inversely with respect to the developed differential pressure, and means for operating said valves by said developed differential pressure for progressively increased rates of flow in excess of said predetermined rate to automatically progressively decrease the rate of adding said solution to the water flowing in said main.

6. In a water treating system, a main adapted to convey a flow of water under pressure, a restriction in said main for developing a differential pressure in proportion to the rate of flow of water in said main, a closed container for a solution for treatment of said water, hydraulic connections between said container and the high and low pressure sides of said restriction, means dependent upon the developed differential pressures and including said hydraulic connections to add quantities of said solution from said container to the water flowing in said main in proportion to the rate of flow therein up to a predetermined rate of flow, pressure operated valves associated with said hydraulic connections, and means for operating said valves by said developed differential pressure for progressively increased rates of flow in excess of said predetermined rate to automatically progressively decrease the rate of adding said solution to the water flowing in said main, and means for varying the rate of flow at which the decreased rate of addition of said solution occurs.

7. In a fluid pressure system, a main adapted to convey a flow of fluid under pressure normally in one direction, means for developing a pressure differential in proportion to the rate of flow of said fluid in said main, a closed container having an agent for adding to the fluid flowing in said main, a pair of pressure taps from said main to said container, means controlled by pressure differential developed by the flow of said fluid in said normal direction in said main and including said pressure taps to divert proportionate amounts of said fluid from said main through said container and back to said main whereby said agent is added to the fluid in said main in proportion to the rate of flow thereof, valves associated with said pressure taps, means for operating said valves by said developed differential pressure to progressively by-pass increasing amounts of said diverted fluid around said container in proportion to the increase of said developed differential pressure beyond a predetermined value and means including said valves to automatically prevent the diversion of fluid from said main when the differential pressure is developed by flow of said fluid through said main in a direction opposite to said normal flow.

References Cited in the file of this patent

UNITED STATES PATENTS

| | | |
|---|---|---|
| 1,085,348 | Ledoux | Jan. 27, 1914 |
| 1,796,407 | Shuldener | Mar. 17, 1931 |
| 2,058,508 | Rolle | Oct. 27, 1936 |
| 2,563,211 | Cassese | Aug. 7, 1951 |
| 2,594,519 | Thurber et al. | Apr. 29, 1952 |